3,243,305
REFRACTORY SHAPES
Albert L. Renkey, Pittsburgh, Pa., assignor to Harbison-Walker Refractories Company, Pittsburgh, Pa., a corporation of Pennsylvania
No Drawing. Filed May 20, 1965, Ser. No. 457,463
3 Claims. (Cl. 106—59)

This application is a continuation-in-part of copending application Serial No. 241,495, filed December 3, 1962, by the same inventor, of the same title, and owned by the same assignee and now abandoned in favor of this application.

Refractory shapes may be termed chemically bonded or ceramically bonded. The chemically bonded shapes are green and unfired shapes, and are put into service in this form. Ceramically bonded shapes are shapes which have been subjected to elevated burning or firing temperatures, to obtain a ceramic bond throughout the particulate material from which the shape is fabricated.

In both chemically and ceramically bonded shapes, the bond itself is probably one of the most important properties. In order to obtain a shape which is easily handled and which stands up in service without spalling, peeling, or breaking away, the bond must be strong and relatively stable. For certain uses, high density and low porosity are equally important properties. These latter properties are desirable in a shape to resist penetration by corrosive metallurgical slags and fumes, which tend to destroy the shape in service.

It has long been known that one of the strongest types of refractory, having the highest density and lowest porosity, is one fabricated entirely of a cast fusion of the constituents which make up the refractory. Many fused cast refractories are now available commercially.

The manufacture of fused shapes is complicated and expensive, and a distressing amount of culls or reject shapes is commonplace. Also, there is great waste of material which is completely fused but which includes flaws, or which must be removed by sawing to reduce the fused refractory shape to required dimensions. Many attempts have been made to utilize these materials to advantage, since they represent a relatively large investment in raw material and labor. It has been suggested that they be comminuted for intermixing with subsequent charges to the fusion process. However, this is expensive, because of the very hard character of some fusions, and the necessity of fine subdivision before the cull material can be reused.

Others have suggested that the culls of a fusion process need not be reduced to such a degree of fine subdivision, but need merely be reduced to a grog particle size to produce a coarse grain for subsequent use in the manufacture of pressed, chemically bonded or ceramically bonded shapes. However, these latter processes have not been completely satisfactory, because good bond formation has been elusive. The search for a good bonding system is demonstrated by the literature, including the patent literature. For example, the recent United States patent to Nelson, No. 2,937,101, has suggested fused magnesia grain bonded with phosphoric acid. The United States patent to Hernandez, No. 3,030,228, suggests bonding electrically-fused magnesia grain with tar, and subjecting it to a subsequent baking or sintering treatment. The two foregoing patents are probably most accurately described as disclosing chemically bonded shapes.

It is an object of this invention to provide an improved ceramically bonded shape fabricated from fused basic refractory grain. It is another object of this invention to provide ceramically bonded, basic refractory shapes fabricated substantially entirely of re-bonded, size graded, fused grain. These shapes have better strength, dimensional stability, and refractoriness under load, as compared to more conventional types of brick made from dead burned or sintered grain alone or in mixture with various crude refractory ingredients.

Briefly, according to one embodiment of the invention, a ceramically bonded basic refractory shape according to the concepts of this invention is fabricated from a batch consisting essentially of a carefully sized graded mixture of fused basic grain, with a minor amount of very finely divided caustic calcined magnesia.

The following examples, given by way of explanation and not by way of limitation, more clearly point out the advantages of this invention. All grain sizing is according to the Tyler mesh series. All parts and percentages are by weight. All chemical analyses are on the basis of an oxide analysis, in conformity with conventional practice in reporting the chemical content of refractory material. All analyses should be considered but typical.

EXAMPLE I

A batch was prepared which consisted of about 96 parts size graded fused grain and about 4 parts of caustic magnesia. These dry ingredients were dry-mixed for about 5 minutes, and then for an additional 5 minutes with about 3 parts of lignin liquor and 1.2 parts of water (tempering fluid). The batch was formed into shapes under a pressure of about 8000 p.s.i. and burned at cone 23 (2820° F.). The density of the resulting shapes averaged about 189 p.c.f., had a modulus of rupture of about 1710 p.s.i., and a cold crushing strength on flat of about 5020 p.s.i. In a load test under 25 p.s.i. pressure, the shapes failed at an average temperature of about 3245° F.

A comparative batch was fabricated entirely of the size graded fused grain of the same manufacturing techniques. These shapes were subjected to the same tests, and showed an average density of 187 p.c.f., a modulus of rupture of about 1570 p.s.i., and a cold crushing strength of about 4220 p.s.i.. In the load test under 25 p.s.i., the shapes failed at an average temperature of about 3175° F.

Shapes of each of the foregoing batches were subjected to molten roll scale slag at a temperature of 2910° F. Shapes made from the batch of this invention, including the caustic magnesia, had a linear change of about +2.5%. The shapes without the caustic magnesia addition had a linear change of over 8%.

The fused grain used for preparation of both of the foregoing batches analyzed about 44% MgO, about 25% $Al_2O_3$, about 17% $Cr_2O_3$, about 4% $SiO_2$, about 7% iron oxide, and the remainder, by difference, being CaO, trace impurities, etc. The size grading for the batches was approximately as follows: about 16% —4 on 10 mesh, about 20% —10 on 28 mesh, about 16% —28 on 65 mesh, the remainder, passing a 65 mesh screen. Of that portion passing the 65 mesh screen, about 35% passed a 150 mesh screen. The caustic magnesia all passed a —325 mesh screen. The analysis of the caustic magnesia was about 97% MgO, the remainder, by difference, being $Al_2O_3$, $SiO_2$, $Fe_2O_3$, and ignition loss.

The foregoing tests indicated a remarkable improvement in properties for ceramically bonded brick substantially entirely fabricated of size graded fused grain, when but a small amount of caustic magnesia is included in the batch. Furthermore, the caustic magnesia addition provided much better handleability for the mix at the press. Shapes fabricated from the batch, without the caustic magnesia addition, tended to crumble at the edges and were difficult to handle. It thus appears the caustic magnesia provides good green bond for the unfired shapes. Further, upon subjecting to elevated firing temperatures, it appears that the caustic magnesia preferentially sinters to periclase crystals about the fused grain. This sintering between the caustic magnesia and fused grain, which tends to assist in the formation of a continuous bond through the fired shapes, appears to be one reason for the improved physical properties of the batch in which the caustic magnesia is included.

EXAMPLE II

Other basic fused grain can be used. For example, a fused grain composed of from 20 to 70% chrome ore and from 80 to 30% of high purity magnesite, and obtained from an electric fusion or like process, can be used. The grain should be size graded to provide the screen analysis substantially the same as set forth under Example I above. However, some variation from that screen sizing may be had, and good results are still obtained. For example, variation within the following ranges is satisfactory: 4 on 10 mesh, 10 to 30%; 10 on 28 mesh, 15 to 35%; 28 on 65 mesh, 0 to 30%; —65 mesh, 30 to 50%.

Even 1%, by weight, additions of the caustic magnesia will obtain improvement over mixes without it. The upper limit is more flexible. However, I prefer that the caustic magnesia be present in a weight amount substantially equal to that portion of the fused grain passing a 325 mesh screen. This is not to say there cannot be more than 5% of —325 mesh fused grain, however. In the final analysis, there is from 1–5% of —325 mesh caustic magnesia; and the fused material is so size graded as to react on firing with the caustic magnesia to provide a fired refractory characterized by a substantially continuous ceramic bond about coarser particles of the fused grain (the —4+65 mesh particles) and in which at least a portion of the bond is crystalline periclase formed from the caustic magnesia.

Having thus described the invention in detail and with sufficient particularity as to enable those skilled in the art to practice it, what is desired to have protected by Letters Patent is set forth in the following claims.

I claim:

1. A fired refractory made from a basic refractory batch, said batch consisting essentially of fused basic refractory grain, said fused basic refractory grain being made from a mixture consisting essentially of, by weight 20–70% chrome ore and 80–30% magnesite, and about 1 to 5% of caustic calcined magnesia, said caustic calcined magnesia substantially all passing a 325 mesh screen, from 70 to 50% of the fused basic refractory grain being +65 mesh, the remainder of the fused basic refractory grain being —65 mesh, about 35% of the —65 mesh fused grain also passing a 150 mesh screen, at least a portion of the fused grain passing a 325 mesh screen, said fired refractory characterized by a substantially continuous ceramic bond about coarser particles of the fused grain, at least a portion of said bond being crystalline periclase formed from said caustic calcined magnesia.

2. A fired refractory made from a basic refractory batch, said batch consisting essentially of fused basic refractory grain, said fused basic refractory grain being made from a mixture consisting essentially of, by weight, 20–70% chrome ore and 80–30% magnesite, and about 1 to 5% of caustic calcined magnesia, said caustic calcined magnesia substantially all passing a 325 mesh screen, from 70 to 50% of the fused basic refractory grain being +65 mesh, the remainder of the fused basic refractory grain being —65 mesh, the overall size grading of the fused basic refractory grain being such as to react upon firing with the caustic calcined magnesia to form a fired refractory characterized by a substantially continuous ceramic bond about coarser particles of the fused grain and in which at least a portion of the bond is crystalline periclase formed from said caustic calcined magnesia.

3. A fired refractory made from a basic refractory batch, said batch consisting essentially of fused basic refractory grain, said fused basic refractory grain being made from a mixture consisting essentially of, by weight, 20–70% chrome ore and 80–30% magnesite, and about 1 to 5% of caustic calcined magnesia, said caustic calcined magnesia substantially all passing a 325 mesh screen, from 70 to 50% of the fused basic refractory grain being +65 mesh, the remainder of the fused basic refractory grain being —65 mesh, at least a portion of the fused grain passing a 325 mesh screen, the fused grain passing a 325 mesh screen being present in a quantity substantially equal to the caustic calcined magnesia which also passes a 325 mesh screen, said fired refractory characterized by a substantially continuous ceramic bond about coarser particles of the fused grain, at least a portion of said bond being crystalline periclase formed from said caustic calcined magnesia.

References Cited by the Examiner

UNITED STATES PATENTS

| | | | |
|---|---|---|---|
| 2,572,688 | 10/1951 | Austin | 106—58 |
| 2,636,827 | 4/1953 | Lanser et al. | 106—59 |

TOBIAS E. LEVOW, *Primary Examiner.*

J. E. POER, *Assistant Examiner.*